US011796836B2

(12) United States Patent
Chamorro et al.

(10) Patent No.: US 11,796,836 B2
(45) Date of Patent: *Oct. 24, 2023

(54) OPHTHALMIC LENS OPTIMIZATION CONSIDERING WEARER'S ACCOMMODATION

(71) Applicant: Indizen Optical Technologies S.L., Madrid (ES)

(72) Inventors: Eva Chamorro, Madrid (ES); José Miguel Cleva, Madrid (ES); Claudia Irazusta, Madrid (ES); Eduardo Pascual, Madrid (ES); José Alonso Fernández, Torrance, CA (US)

(73) Assignee: Indizen Optical Technologies S.L., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,355

(22) Filed: Feb. 16, 2023

(65) Prior Publication Data

US 2023/0194894 A1      Jun. 22, 2023

Related U.S. Application Data

(63) Continuation of application No. 17/091,786, filed on Nov. 6, 2020, now Pat. No. 11,609,437.

(51) Int. Cl.
*G02C 7/02* (2006.01)
*G02C 7/04* (2006.01)

(52) U.S. Cl.
CPC ............. *G02C 7/027* (2013.01); *G02C 7/025* (2013.01); *G02C 7/041* (2013.01)

(58) Field of Classification Search
CPC ......... G02C 7/041; G02C 7/025; G02C 7/027
(Continued)

(56) References Cited

U.S. PATENT DOCUMENTS

| 4,310,225 A | 1/1982 | Davis |
| 7,111,937 B2 | 9/2006 | Landgrave et al. |

(Continued)

FOREIGN PATENT DOCUMENTS

| EP | 1188091 A1 | 3/2002 |
| ES | 2337970 A1 | 4/2010 |

OTHER PUBLICATIONS

European Intellectual Property Office, European Search Report for Application No. EP21201829, dated Apr. 5, 2022, 9 total pages.

(Continued)

*Primary Examiner* — James R Greece
(74) *Attorney, Agent, or Firm* — SoCal IP Law Group LLP; Angelo J. Gaz; Mark A. Goldstein

(57) ABSTRACT

Configuring ophthalmic lenses that reduce oblique aberrations based on a wearer's accommodative demand values is disclosed. The accommodative demand values include $A_{(rel-)}$ and $A_{(rel+)}$ depend on object vergence L. The accommodative demand values are considered to and ensure no or reduced eye strain to the wearer. An improved merit function $\Phi'$ is calculated based on the accommodative demand values. In the calculation, accommodative term A is a smooth and continuous function of both the object distance L and the spherical component of the power error. This ensures the accommodative demand values are well below maximum relative accommodations available to the wearer to prevent eye fatigue. The calculation may also include a smooth and continuous thresholding function $f$ that optimizes the merit function. The calculation may also include evaluation of the power error associated with various object vergencies for every direction of sight.

22 Claims, 13 Drawing Sheets

500

© 2023 INDIZEN OPTICAL TECHNOLOGIES, S.L.

(58) Field of Classification Search
USPC .................................................. 351/159.74
See application file for complete search history.

(56) References Cited

U.S. PATENT DOCUMENTS

| 8,226,230 B2 | 7/2012 | Yamakaji |
| 10,330,950 B2 | 6/2019 | Alonso et al. |
| 2010/0039614 A1 | 2/2010 | Morris et al. |
| 2011/0202421 A1* | 8/2011 | Yamakaji ............... G02C 7/028 356/124 |

OTHER PUBLICATIONS

Thibos, L., Wheeler, W., & Homer, D. (1997). Power Vectors: An Application of Fourier Analysis to the Description and Statistical Analysis of Refractive Error. Optometry and Vision Science, 74(6), 367-375. doi: 10.1097/00006324-199706000-00019.

Alonso, J., Gomez Pedrero, J., & Quiroga, J. (2019). Modern ophthalmic optics.

Peters, H. (1961). OThe Relationship Between Refractive Error and Visual Acuity at Three Age Levels. Optometry and Vision Science, 38(4), 194-198. doi: 10.1097/00006324-196104000-00002.

Raasch, T. (1995). Spherocylindrical Refractive Errors and Visual Acuity. Optometry and Vision Science, 72(4), 272-275. doi: 10.1097/00006324-199504000-00008.

Thibos, L., & Horner, D. (2001). Power vector analysis of the optical outcome of refractive surgery. Journal of Cataract & Refractive Surgery, 27(1), 80-85. doi: 10.1016/s0886-3350(00)00797-5.

Miller, J. (2009). Clinical Applications of Power Vectors. Optometry and Vision Science, 86(6), 599-602. doi: 10.1097/opx.0b013e3181a6a211.

Caum Aregay, J., Fransoy Bel, M., & Salvado Argues, J. (2001). Tecnologia optica. Barcelona: Edicions UPC.

* cited by examiner

200

250

US 11,796,836 B2

OPHTHALMIC LENS OPTIMIZATION CONSIDERING WEARER'S ACCOMMODATION

RELATED APPLICATIONS

The present application is a continuation of U.S. application Ser. No. 17/091,786, filed Nov. 6, 2020, under the same title, of which is hereby incorporated by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the reproduction by anyone of the patent disclosure as it appears in the Patent and Trademark Office patent files or records, but otherwise reserves all copyright and trade dress rights whatsoever.

BACKGROUND

Field

This disclosure relates to ophthalmic lenses, and more specifically to single-vision lenses used by non-presbyopic users, progressive addition lenses used for presbyopic users, and occupational lenses used by presbyopic users to view all working distances, side to side, up and down, within a conventional working distance known.

Related Art

Ophthalmic lenses improve the vision of a wearer. Advanced (or customized) ophthalmic lenses are configured in an attempt to increase the satisfaction of a wearer by compensating for oblique aberrations to increase visual quality. Typically, the compensation of oblique aberrations takes into consideration factors such as prescription, position of wear or object space. However, physiological parameters such as accommodation can also be taken in consideration. Various calculations for lens design have been proposed. U.S. Pat. No. 4,310,225, European Patent 1,188,091 and U.S. Pat. No. 7,111,937 propose spectacle lenses calculated assuming the wearer uses a certain amount of accommodation. However, none of these calculations consider the effect of object vergence over the amount accommodation accessible by the user, nor do they consider that the eye can not only increase its accommodative response but also relax it. Further, eye fatigue effects derived from using accommodation for lens optimization are not addressed in these patents.

U.S. Pat. No. 8,226,230 describes a spectacle lens evaluation, design and manufacturing method that incorporates visual acuity. The merit function proposed in this patent uses Peter's data and Raasch model for visual acuity computation, introducing a relative accommodation power factor dependent on wearer's age and convergence. This merit function is used to optimize both progressive and single vision lenses using visual acuity thresholds. However, this patent's disclosure has some deficiencies. First, the method and calculation disclosed in the patent uses a visual acuity model based on Peter's study that cannot be relied on to provide accurate values of either visual acuity or accommodation. Second, Yamakaji does not consider object distance for visual acuity or accommodation calculations, even though the object distance value has an important impact over both magnitudes.

This disclosure provides an optimization method to reduce oblique aberrations in ophthalmic lenses used for single-vision lenses, progressive lenses and occupational lenses.

Figure 1:
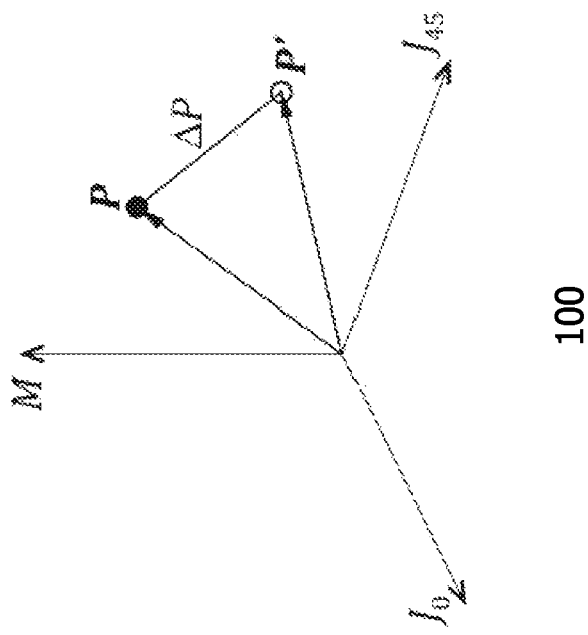
FIG. 1 is a graphical representation of the target power P, the oblique power P' and the oblique power error ΔP.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The methods described herein provide an optimization method that uses a wearer's accommodation to improve the reduction of oblique aberrations in ophthalmic lenses used for single-vision lenses, progressive addition lenses and occupational lenses. Benefits of the methods described herein include producing lenses with higher optical quality than lenses only having a prescription geometry of the surfaces. According to the methods described herein, specific calculations allow adjustments for correction of oblique aberrations depending on the intended use of the lens design. For example, for a lens designed mainly for far distance, it is given a higher weight of oblique aberrations for far distance. The calculations in the method herein build an object space adapted to a user's (that is, a wearer of the lens) characteristics and intended use of the lens design so that the user can use the lens in a different object space depending on their accommodative capacities and lifestyle. The calculations in the method incorporate additional variables to lens personalization, such as the user's accommodative reserve that can be measured or estimated.

Lenses produced according to the method increase the satisfaction of ophthalmic lens wearers, as the lenses provide a better compensation—that is, controlling and reducing—of oblique aberrations and thus provide better visual quality. The method also provides smoother maps of residual aberrations, and consequently the resulting lens increases the user's comfort when using the lenses.

The methods described herein personalize lenses by controlling the asphericity of the lens surfaces to compensate for oblique aberrations. Oblique aberrations depend on the viewing distance. If a lens has been optimized for far vision, it will not be optimal for near vision and vice-versa. In some cases, the natural eye accommodation can compensate for the spherical component of the oblique aberration. The method described herein provides improved lens personalization by using a new or improved merit function that takes into account both the accommodation capacity of the user and the viewing distance or object vergence.

According to the methods described herein, a specific new merit function allows for the optimization of oblique aberrations by including one or more of the following features:
 a. A physiological merit function that consider user accommodation to optimize oblique aberrations;
 b. A new way to incorporate threshold of blur detection that avoids discontinuity of the merit function; and/or
 c. The use of a volumetric object space considering the range of working distances accessible to the user by means of its accommodation ability, and the balancing of the oblique aberrations in the whole volumetric object space.

So that the features and benefits of the methods herein can be better understood, a listing of terms and calculations used herein follows.

The term "oblique aberration" means an aberration generated in any optical instrument, including ophthalmic lenses due to the obliquity of incident light rays that are refracted over the lens surfaces. In this sense, a beam of parallel rays that incides (that is, is incident) obliquely on the surface of the lens, becomes astigmatic (the refracted beam is known as the Sturm conoid). The circle of minimum confusion is the point where the sharpest image is formed. Therefore, the correction of the spherical component of the oblique aberrations seeks that the circle of minimum confusion is located on the remote sphere of the user. The correction of the astigmatic component of the oblique aberration seeks that the size of the circle of minimum confusion is as small as possible.

The term "power vector" stands for a 3D vector whose components are related to the three parameters traditionally used to describe power: sphere, cylinder, and cylinder axis, (S, C, A). It is also common to use the power vector (M, $J_0$, $J_{45}$), given by:

$$M = S + \frac{C}{2},$$

$$J_0 = -\frac{C}{2}\cos 2A,$$

$$J_{45} = -\frac{C}{2}\sin 2A.$$

Using this representation, the target power of the lens is defined as P=(M, $J_0$, $J_{45}$) and the actual power of the lens affected by oblique aberration P'=(M', $J'_0$, $J'_{45}$) for a given direction of sight. One of the reasons for using this representation is the three components of the power vectors are additive, while the traditional cylinder and axis are not. Because of this property, the oblique power error is given by ΔP=P'−P. FIG. 1 is a graphical representation 100 of the target power P (filled circle), the oblique power P'(empty circle) and the oblique power error ΔP with respect to the axes (M, $J_0$, $J_{45}$). The amount of blur or defocus perceived by the user for that particular direction of sight is proportional to the length of the oblique power error such as shown in FIG. 1 and in the equation:

$$d(P',P)=|\Delta P|=\sqrt{(M'-M)^2+(J'_0-J_0)^2+(J'_{45}-J_{45})^2}$$

Figure 2A:
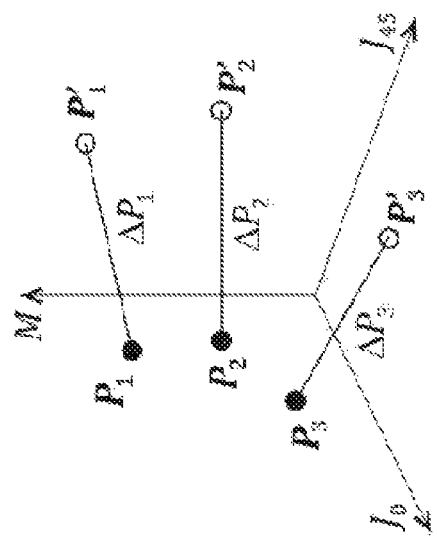
FIG. 2A is a graphical representation of target power of a single vision lens and oblique powers for three different directions of sight.

FIG. 2A is a graphical representation 200 of target power P (filled circle) of a single vision lens and three oblique powers for three different directions i=1-3 of sight $P'_i$ (empty circles). Single vision lenses typically have a single target power P (filled circle) with a constant value, as pictured in FIG. 2A.

Figure 2B:
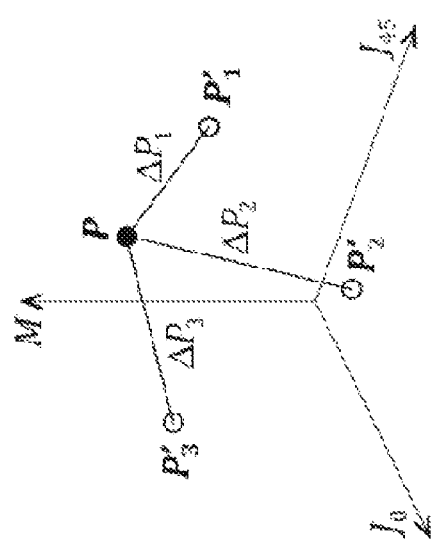
FIG. 2B is a graphical representation of target powers for three different sight directions of a progressive lens and their corresponding oblique powers.

FIG. 2B is a graphical representation 250 of target powers for three different sight directions i=1 to 3 of a progressive lens $P_i$ (filled circles) and their corresponding oblique powers $P'_i$ (empty circles). Progressive lenses have different target powers for each direction of sight. FIG. 2B shows three examples of different sight directions for a progressive lens with their corresponding oblique powers.

The term "power vector space" means a three-dimensional space generated by representing the M, $J_0$, $J_{45}$ along the XYZ axes (see FIG. 1). For a given viewing direction i, the power provided by the lens is ($S_i$, $C_i$, $A_i$), but these quantities do not form a vector as they are neither additive, nor homogeneous. However, the quantities ($M_i$, $J_{0_i}$, $J_{45_i}$) are homogeneous and additive, and they form a vector in a 3D space with axis M, $J_0$ and $J_{45}$. A particular power or prescription is represented by a point within this dioptric space, as shown in FIGS. 1 and 2A-B.

The term "base curve" means the curvature of the front surface of an ophthalmic lens.

Figure 3:
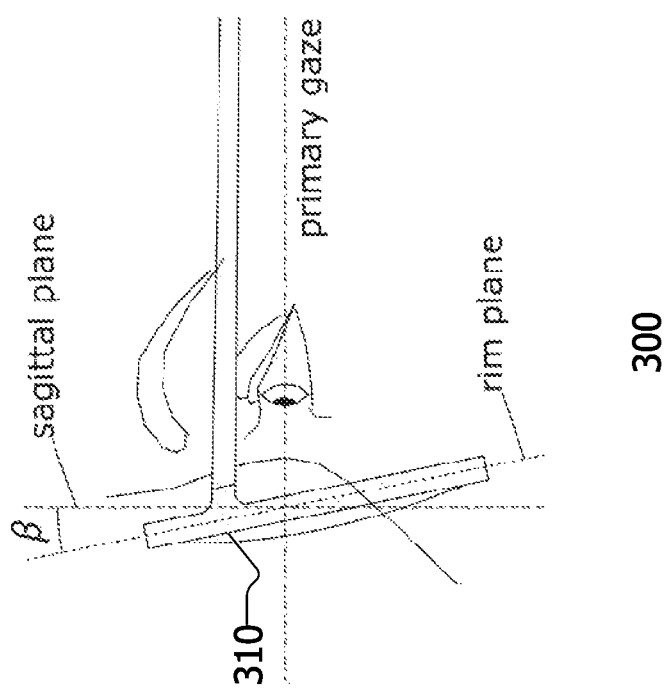
FIG. 3 is a graphic representation of pantoscopic angle β.

The term "pantoscopic angle" means lens tilt about the horizontal axis with respect to the primary gaze position of the wearer. FIG. 3 is a graphic representation 300 of pantoscopic angle β, the angle formed by the plane containing the spectacle frame rims 310 with the sagittal plane of the user head when he looks at a distant object in the primary gaze position.

Figure 4:
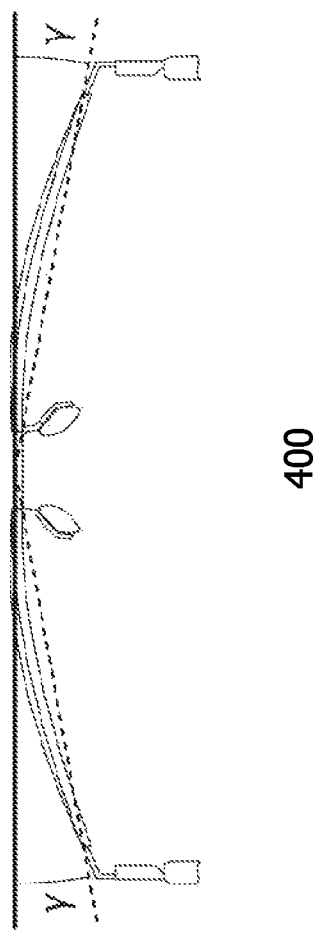
FIG. 4 is a graphic representation of a definition of facial angle, γ.

The term "facial angle" means a horizontal angle formed by the rim's plane of the frame and the sagittal plane of the wearer's head. FIG. 4 is a graphic representation 400 of facial angle, γ, which may be the horizontal angle of the plane containing the rim of the spectacle frame. It also may be the angle formed by the projection of the sagittal and rim plane over the plane defined by the three points in which the spectacle frame is held against the head. In this case, the three points are the top of the nose and the top of the ears (more precisely, the contact point between the ear helix and the head).

The term "vertex distance" means the distance between the back surface of an ophthalmic lens and the front of the cornea.

Figure 5:
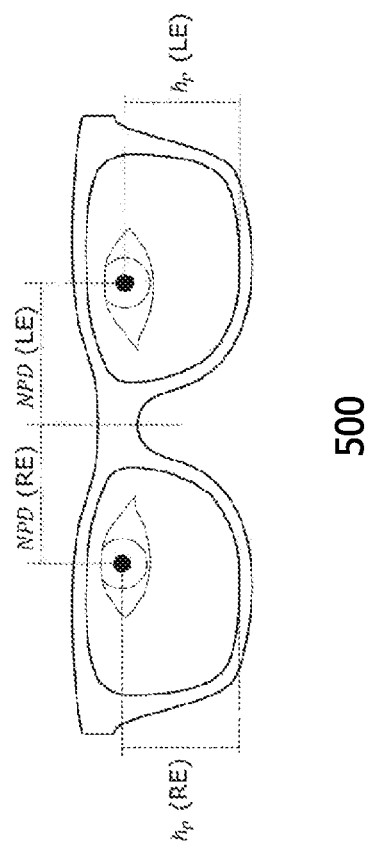
FIG. 5 is a graphic representation of the location of the right and left eye pupils, in primary gaze position.

The term "pupillary distances" means the position of the pupil center is given by two distances: the naso-pupillary distance (NPD), which is the horizontal distance between the pupil and a vertical line equidistant to the two boxed centers of the frame; and the pupil's height, the vertical distance between the pupil and the lower end of the inner rim. FIG. 5 is a graphic representation 500 of the location of the right and left eye pupils in primary gaze position and their naso-pupillary distances NPD. The parameter $h_p$ refers to the "pupil height" and is the height of the pupil over the lowest horizontal line of the box containing the frame.

The term "object vergence" means the inverse of the object distance. It is measured in diopters (D), and it is given the symbol L. L=0 D stands for far vision (objects that are located at infinity), while L=−2.5 D stands for near vision (objects that are located at −0.4 m). Standard sign criterion in visual optics considers object distance as negative.

The term "amplitude of accommodation" means the maximum power increase that the eye can achieve to adjust focus for close objects.

The term "relative accommodation" means the total amount of accommodation that can be exerted under fixed eye convergence. Positive relative accommodation ($PRA_0$) is a measure of the maximum ability to stimulate accommodation while maintaining clear, single binocular vision. Negative relative accommodation ($NRA_0$) is a measure of the maximum ability to relax accommodation while maintaining clear, single binocular vision. As both $PRA_0$ and $NRA_0$ cannot be achieved near the edges of the range of clear vision, it is possible to instead use the functions:

$$NRA(L) = \begin{cases} NRA_0 & \text{if } -L > NRA_0 \\ -L & \text{if } -L \leq NRA_0 \end{cases} \text{ and}$$

$$PRA(L) = \begin{cases} PRA_0 & \text{if } L + AA > |PRA_0| \\ -L & \text{if } L + AA \leq |PRA_0| \end{cases}$$

where AA is the amplitude of accommodation of the user.

The term "prescription" means the refractive error of a given person. The term "prescription" is quantified as the power of a lens worn in front of the eye, at a given distance, so that the eye can sharply focus on distant objects. Typically, the vertex of the back surface of the lens is located 13 mm from the corneal vertex. The prescription has three parameters, typically sphere, S, cylinder C and axis A. The prescription is represented by the three parameters as [$S_0$, $C_0 \times A_0$].

The term "mean sphere" is represented as $H_0$ and defined by the equation $H_0 = S_0 + C_0/2$.

The term "accommodation" refers to an additional increment of optical power in an eye that allows a person to focus on near objects. The range of accommodation decreases with age, and this effect is known as presbyopia.

The term "addition" refers to additional or extra power in a lens that compensates for the accommodation loss experienced by the presbyopic person wearing the lens. The term addition is designated by Add. A prescription may also include addition values.

The term "progressive lenses" refers to lenses in which power increases smoothly from the prescription value [$S_0$, $C_0 \times A_0$] at a point intended to focus on far objects (referred to as the "distance reference point" or "DRP") to the near-prescription value [$S_0$+Add, $C_0 \times A_0$], a point intended to focus on near objects (referred to as the "near reference point" or "NRP"). Power changes continuously across the surface of a progressive lens. The line connecting the DRP and the NRP is typically referred to as an umbilical line. The points along this line are umbilical, that is, they do not have astigmatism other than the prescription astigmatism $C_0$. To represent the power variations of a progressive lens, maps of mean sphere H and cylinder C, are used.

According to the methods described herein, it is possible to create lenses with minimum and indiscernible defocus in wider visual areas of the lens and in a wider range of prescriptions, due to the incorporation of the wearer's accommodation capacity in the calculation of oblique aberrations. The methods herein also allow for calculating lenses providing higher visual quality for more than one working distances, due to the use of a volumetric object space that considers accommodation capacity of the user. It follows that the methods herein provide a higher level of lens personalization, by considering the accommodation capacity of the user (real or estimated) and lifestyle characteristics, resulting from the use of weights and other parameters to adjust the merit function that incorporates the object space of the user. In some cases, weights and other parameters (for example those used in the functions $f$ or A) adjust the convergence of the merit function minimization algorithm and also the surface finally obtained.

Correction of Oblique Aberrations

Lens optical power is traditionally defined by three parameters: sphere S, cylinder C, and cylinder axis A. It is also common to use the power vector $P=(M, J_0, J_{45})$ given by:

$$M = S + \frac{C}{2},$$

$$J_0 = -\frac{C}{2}\cos 2A,$$

$$J_{45} = -\frac{C}{2}\sin 2A.$$

The triplet $P=(M, J_0, J_{45})$ may be used instead of (S, C, A) to provide the same information but with added mathematical and clinical advantages. Typical design methods use a merit function with the following general form:

$$\Phi_0 = \sum_{i=1}^{N}\alpha_i(M'_i - M_i)^2 + \sum_{i=1}^{N}\beta_i(J'_{0_i} - J_{0_i})^2 + \sum_{i=1}^{N}\gamma_i(J'_{45_i} - J_{45_i})^2$$

where i is an index running through all the possible sight directions to be considered during lens optimization. For example, it is possible to devise a grid of points regularly or irregularly scattered all over the lens and consider the gaze directions passing through each of these points. Then $P_i = (M_i, J_{0_i}, J_{45_i})$ is the target power wanted at point i, whereas $P'_i = (M'_i, J'_{0_i}, J'_{45_i})$ is the actual power of the lens. In the particular case of single vision lenses, the target power $P_i$ used during optimization is constant and equal for all the lens points. $\alpha_i$, $\beta_i$ and $\gamma_i$ are numbers called weights that give different importance to different points. At a given stage during optimization, the values of each of $M'_i$, $J'_{0_i}$, $J'_{45_i}$ are computed and with the weights, the value of $\Phi_0$ is also computed. Optimization can progress by modifying the surface, re-computing $\Phi_0$ and comparing the $\Phi_0$ of the modified surface with the previous value. If the new value is smaller, the surface modifications can be accepted for designing a lens. The process repeats re-computing $\Phi_0$ until the smallest possible $\Phi_0$ is obtained. This is a simple description of the optimization process, other implementations and variations of the process may differ considerably, although the final objective is the same: to produce a lens whose distributions of $(M', J'_0, J'_{45})$ are as similar as possible to the proposed objective distribution of $(M, J_0, J_{45})$.

As previously stated, oblique aberrations are inevitable and considerably degrade the vision quality of spectacle lenses. The amount of oblique aberration exhibited by a lens for a given direction of sight depends on a wide variety of personalization parameters that include among others, one or more of the following: prescription, refractive index, base curve, pantoscopic and facial angles, vertex distance and pupillary distances, and other measurements. An optimum lens can be obtained, such as one with a reduced or minimum amount of oblique aberrations achievable, by performing an optimization using $\Phi_0$ with the aforementioned parameters. Although, it may not be possible to cancel or fully compensate these aberrations for all directions of sight due to the geometrical constraints of the lens surface.

The Method

There is a limit to the amount of oblique aberration that can be compensated for using the standard methods of lens optimization. Taking into account the accommodative power of the eye in the new and improved merit function, however, constitutes an effective way of reducing oblique aberration beyond earlier limits. The new merit function takes into account a certain amount of the wearer's accommodation during optimization. As a result, the astigmatic component of the power error can be mostly compensated, because the spherical component of the power error is left partially uncompensated by a residual spherical component error and the optimization (or new merit function) assumes that the small, natural power adjustments of the wearer's eye will cancel this residual spherical component error. As important as the accommodation mechanism of the eye is, its effect has not been incorporated properly into prior lens calculations.

Physiological merit functions that use accommodation to minimize the spherical component of the power error (difference between expected power and real lens power) such as the one presented below are applicable in the ophthalmic sector:

$$\Phi = \sum_{i=1}^{N} (M'_i - M_i - A_i)^2 + \beta_i(C'_i - C_i)^2,$$

where $A_i$ represents the amount of accommodation considered at point i and $\alpha_i$ and $\beta_i$ are weights balancing the compensation of mean sphere vs the compensation of oblique astigmatism, and the balance among different sight directions or lens regions.

Thresholding functions $f$ and/or $g$ included in these merit functions act as follows:

$$\Phi = \sum_{i=1}^{N} \alpha_i f\left[(M'_i - M_i - A_i)^2\right] + \beta_i g\left[(C'_i - C_i)^2\right],$$

where both $f$ and $g$ equal zero when their arguments get smaller than certain given threshold values. That means that the merit function goes to zero when the oblique errors in cylinder and mean sphere are below certain threshold values.

However, the implementation of such merit functions for lens calculation is limited due to the mathematical complexity derived from the following limitations:

a. Models of the accommodative response $A_i$, such as the one presented below, exhibit discontinuous derivatives that result in convergence issues of the most effective optimization algorithms, which use the gradient of the merit functions:

$$A_i = \begin{cases} A_{min}, & M'_i - M_i \leq A_{min} \\ M'_i - M_i, & A_{min} < M'_i - M_i < A_{max} \\ A_{max}, & M'_i - M_i \geq A_{max} \end{cases}$$

where $A_{max}$ and $A_{min}$ are the upper and lower saturation limits considered for the model.

b. Thresholding functions can present discontinuous behavior that may result in convergence issues of the optimization algorithm, especially if the merit function incorporates more terms to minimize, for example, lens thickness or lens weight, beside the terms described above to minimize oblique aberrations.

c. Merit functions that take into account accommodation should consider object distance in $A_i$ computation. Oblique aberrations can depend on object distance and so can the amount of accommodation that is brought into play by the eye. The latter can be easily understood with an example. When using the far vision area of a progressive lens and focusing at infinity, the wearer will not be able to further relax their accommodation, that is, its negative relative accommodation (NRA) will become zero. Similarly, when using the near vision region wearers affected by presbyopia will not be able to accommodate beyond a certain limit, that is, the positive relative accommodation (PRA) becomes very small as it approaches a constant small value between 0.5 and 1 D. Physiological accommodation goes to zero at approximately 55-60 years of age, but clinically it is possible to measure an accommodation in the range 0.5 to 1 D, depending on wearer's depth of focus and the clinical method employed by the eye doctor. For this age, the addition prescribed usually allows for clear vision at the most preferred viewing distance. For example, if the patient reading distance is 40 cm, it will get 2.5 D of addition, no accommodation needed. Yet, the user has this "reserve accommodation" that could be potentially used as PRA.

PRA is a measure of the maximum ability to stimulate accommodation while maintaining clear, single binocular vision. This measurement is typically obtained by an orthoptist, ophthalmologist or optometrist during an eye examination using a phoropter. After the patient's distance correction is established, she or he is instructed to view small letters on a card 40 cm from the eyes. The examiner adds lenses in −0.25 diopter increments until the patient first reports that they become blurry. The total value of the lenses added to reach this point is the PRA value. High PRA values (>=−3.50 diopters) are considered to be diagnostic of disorders involving accommodative excess. Those with accommodative insufficiency typically have PRA values below −1.50 diopters. NRA may be used as a measure of the maximum ability to relax accommodation while maintaining clear, single binocular vision. This measurement is typically obtained by an orthoptist, ophthalmologist or optometrist during an eye examination using a phoropter. After the patient's distance correction is established, he or she is instructed to view small letters on a card 40 cm from the eyes. The examiner adds lenses in +0.25 increments until the patient first reports that they become blurry. The total value of the lenses added to reach this point is the NRA value. High NRA values (above +2.50) might be evidence to over minus, uncorrected hyperopia or latent hyperopia.

According to the method described herein, a new class of merit functions Φ that overcomes other shortcomings can be used to produce lenses by considering wearer's accommodation. Some embodiments of the method use an improved merit function whose optical component depends only on blur. Blur can be the optical quantity that is minimized for ophthalmic lenses. Blur can be obtained from the power vectors, $d=|\Delta P|$, obtained as the norm of the oblique error in matrix form, $d=(1/\sqrt{2})\|\mathbb{P}'-\mathbb{P}\|$, and/or obtained in terms of the errors of sphere and cylinder. Of these three, the errors of sphere and cylinder requires a more complex calculation, as the cylinder error should not be computed as a simple difference between the target and the actual cylinder. In terms of power vectors, the function to minimize blur for all the sight directions and for a given object vergence L would have the basic form:

$$\sum_{i=1}^{N} \alpha_i f\left[d^2(P', P, A(M_i', M_i, L))\right].$$

The accommodative term A is a smooth and continuous function of both the object vergence L and the spherical components of the target and actual power vectors and it ensures the accommodative demand is well below the maximum relative accommodation available to the wearer in order to prevent eye fatigue. The value of the accommodative term A is computed as follows:

a. First, the difference in spherical equivalent A between the target and the actual lens can be evaluated for each direction of sight:

$$\Delta = M'_i - M_i$$

The sign of Δ will determine whether the eye needs to increase its accommodation or relax it in order to reduce the value of Δ: A positive value of Δ means the mean spherical power (that is, the mean sphere) of the lens is greater than expected, and so the eye would need to relax slightly its accommodation; a negative value of Δ indicates the mean spherical power of the lens is below the target and the eye would need to increase its accommodative response to reduce the spherical component of the power error.

b. Taking into account the previous result it is possible to compute the value of A using a smooth and continuous function of Δ with a lower saturation value equal to the wearer's allowed relative positive accommodation $A_{rel+}$ (a negative quantity that represents the maximum amount of power to let the eye increase its accommodation when Δ<0) and an upper saturation value equal to the wearer's allowed relative negative accommodation $A_{rel-}$ (a positive quantity that represents the maximum amount of power to let the eye reduce its accommodation when Δ>0). These two values are related with the clinically measured PRA and NRA through the equations:

$$A_{rel+} = \alpha_+ PRA(L),$$

$$A_{rel-} = \alpha_- NRA(L),$$

where $\alpha_+$ and $\alpha_-$ are constants satisfying $0<\alpha_+, \alpha_-<1$ and providing security margins so that the user noticing the effort of increasing/relaxing accommodation to compensate for oblique mean sphere error is negligible to the user. From clinical research conducted it can be concluded that the values $\alpha_+=0.75$ and $\alpha_-=0.5$ will allow for a significant improvement on lens design without the patient noticing any stress in its accommodation/convergence relation, that is with total wearing comfort. Both $A_{rel+}$ and $A_{rel-}$ inherit the dependence of PRA and NRA on the object vergence, as seen in their definition.

Figure 6:
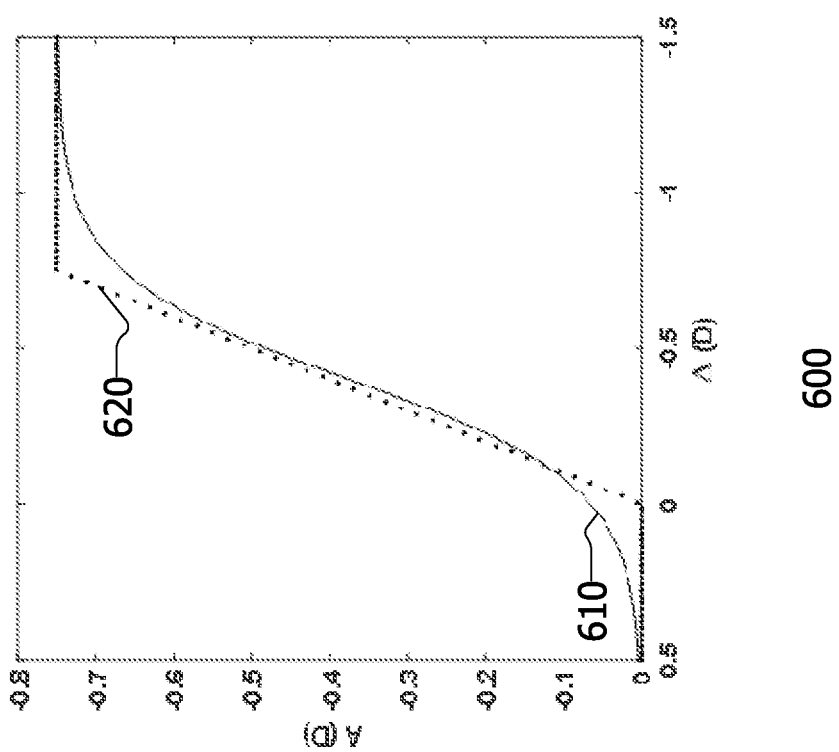
FIG. 6 is a graphic representation of a continuous line example of the accommodative response A according to the method described herein.

An example of the accommodative term A of the new merit functions is:

$$A = A_{rel+}(L) + \frac{A_{rel-}(L) - A_{rel+}(L)}{1 + e^{-\frac{(\Delta-\Delta_0)}{t}}}$$

where $\Delta_0$ and t are parameters of the model. FIG. 6 is a graphic representation 600 of a continuous line example 610 of the accommodative response A proposed in the present technology, calculated with a smooth function of the spherical error and $\Delta_0=0.4D$, $t=0.17D$, $A_{rel+}=-0.75D$ and $A_{rel-}=0D$. The dashed line 620 is the discontinuous function presented in the text with $A_{min}=-0.75D$ and $A_{max}=0D$.

The values of $A_{rel-}$ and $A_{rel+}$ depend on the object vergence L and can be obtained from optometric measurements (such as via manual or automatic devices) ensuring the accommodative demand causes no eye strain to the patient. In some cases, the wearer's accommodation demand information includes or is the accommodative demand values A_(rel−) and A_(rel+) as measured from a lens wearer, such as by an optometrist. In some cases, the parameters Arel+ and Arel− are not measured. In this case, a pair of safety values for the parameters can be determined that guarantee comfort for most users. The safety values can be obtained from statistical data, so no measurement or extra parameters will be needed. In some cases, the accommodation demand information includes or is the accommodative demand values A_(rel−) and A_(rel+) statistically inferred from the wearer's demographic and optical characteristics. The optical characteristics may be those of the wearer demographic or those of the wearer. Some examples of wearer's optical characteristics are: prescription, amplitude of accommodation, phorias, and, to a lesser extent, nasopupillary distances, and others. Demographics may include region inhabited, race, sex, age, visual needs (far vs near, intensive computer use, etc.), and others.

In some cases, the wearer's accommodation demand information is obtained via manual and/or automatic devices. Here, PRA and NRA can be obtained with optometric tests involving active intervention from the optometrist (manual devices) or automatic equipment that only requires the wearer looking through some sort of instrument, or as indirect results from other tests. This can describe differences between "manual" and "automatic" methods of determination.

Figure 7:
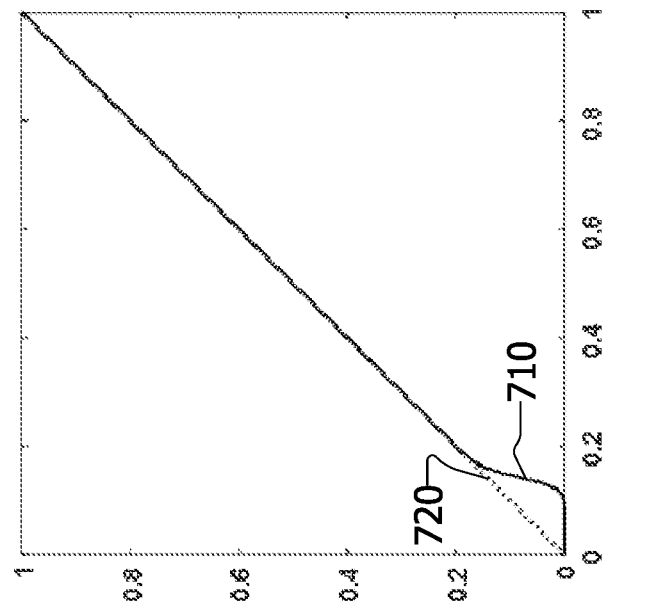
FIG. 7 is a graphic representation of a solid line of the continuous thresholding function $f$ proposed according to the method described herein.

For the new merit function, $f$ is a continuous and smooth function of $d^2$ (P', P, $A_i$(M'$_i$, L)), the defocus squared, that sets a threshold to the optimization. An example of this function $f$ is:

$$f(x) = \frac{c}{1 + \frac{e^{-\frac{(x-x_0)}{k}}}{x}}$$

where c, $x_0$ and k are parameters of the model. FIG. 7 is a graphic representation 700 of a solid line 710 of the continuous thresholding function $f$ proposed in the present technology applied to $d^2$ (P', P, $A_i$ (M'$_i$, M$_i$, L)) with c=1, $x_0$=0.12 $D^2$ and k=0.01 $D^2$. The dashed line 720 shows the merit function when no threshold is applied to the optimization.

The new merit function Φ evaluates the oblique power error for several object vergencies at each sight direction. Otherwise, it would be limiting the range of usability of the lens. Looking through the far vision area of a progressive lens at a distant object, it is possible to obtain the optimum visual quality; however, oblique aberration (and hence defocus) will not be optimal (that is, minimal) when looking through the same point at a closer object, at intermediate or near distance. By evaluating the defocus for several object vergencies it is possible to balance the lens performance for different object vergencies and vastly increase the lens performance for all the range of object distances. To compute the configuration of a pleasing, more effective ophthalmic lens, an enhanced, improved merit function is used. The method to compute the configuration or lens having the computed configuration uses the total merit function. An embodiment of the complete optical component of the merit function Φ' can be constructed as:

$$\Phi' = \sum_{j=1}^{S} \omega_j \left\{ \sum_{i=1}^{N} u_i f\left[ (M'_i(L_{ij}) - M_i - w_{ij} A_{ij}(M'_i(L_{ij}), M_i, L_{ij}))^2 + (J'_{0_i}(L_{ij}) - J_{0_i})^2 + (J'_{45_i}(L_j) - J_{45_i})^2 \right] \right\} \equiv \equiv$$

$$\sum_{j=1}^{S} \omega_j \left\{ \sum_{i=1}^{N} u_i f\left[ d^2(P'_i(L_{ij}), P_i, w_{ij} A_{ij}(M'_i(L_{ij}), M_i, L_{ij})) \right] \right\}$$

where the subindex i denotes directions of sight and j denotes different object distances for a given sight direction. S is the total number of object vergencies included inside the range of clear vision while N is the number of sight directions considered for the optimization. $\omega_j$ are weights that depend on the object vergence. An example of implementation with two object vergencies (S=2) could be $\omega_{1,2}$=0.5. This selection would balance the minimization of the oblique aberration for two object distances the user is able to focus at. $u_i$ is the weight assigned to each direction of sight and $w_{ij}$ is a modulating factor of the accommodative term $A_{ij}$ that depends on the direction of sight and the object vergence. These weights are especially important when computing progressive lenses, where the use of correcting accommodation must be turned off along the umbilical line to avoid any distortion to the expected power profile of the lens. Fortunately, oblique aberrations can be completely removed along a line, and this turning off of correcting accommodation along the umbilical line will not affect the quality of the lens. In one example, completely removing oblique aberrations along a line helps to incorporate accommodation in merit functions for progressive lenses. In an example implementation, $u_i$ and $w_{ij}$ values would depend on the x and the y coordinates of the lens in the optical areas and on the cylinder values in the laterals.

Processes for generating the object vergencies to use in calculating the new merit function include considering that for a given sight direction, the lens may have certain amount of local addition, namely $\mathcal{A}_i$. For example, if the lens is single-vision and intended for non-presbiopic wearers, a local addition may be chosen that is $\mathcal{A}_i$=0 for all i. If the lens is single-vision for near-distance and presbyopic wearers (commonly named "reader") then a local addition may be chosen that is $\mathcal{A}_i$=Add for all i. If the lens is a progressive lens, local addition will change from zero at the Distance Reference Point to Add at the Near Reference Point. Henceforth, addition will be a function of the sight direction in lenses with variable power.

Then, for a given sight direction i, object vergencies can be considered in the range:

$L_{ij} \in [-\mathcal{A}_i-AA, -\mathcal{A}_i]$, where AA is the amplitude of accommodation of the user. This range is known as the "range of clear vision" and comprises all the vergencies the user can accommodate with the use of the lens local addition and its own accommodation.

In the simplest possible implementation of the current technology, two values of j can be chosen per each sight direction, for example the (near and far distance) edges of the interval:

$L_{i1} = -\mathcal{A}_i - AA, L_{i2} = -\mathcal{A}_i$.

In a more sophisticated implementation, could also use some extra vergence values in between the edges of the interval, so j≥3. For example by adding the vergence corresponding to the center of the interval, $L_{i3} = -\mathcal{A}_i - AA/2$.

In general, and specially for single vision lenses, a "most probable object vergence", $L_{i0}$ can be defined for each sight direction i. For example, if the lens is a single vision lens intended only for far vision (for example a prescription sunglass), $L_{i0}$=0 for all i. If the lens is single vision, but intended for general use, the setting $L_{i0}$=0 may be chosen for the upper portion of the lens, intended for far vision, and $L_{i0}$=−2 D chosen for those sight directions passing through the lower portion of the lens, which usually will imply near vision. Finally, if the lens is intended for computer use, at a distance of 0.6 m, the selection $L_{i0}$=−1.67 D can be chosen. Then, a range around the most probable object vergence can be established, which provides a volumetric region in which the lens will be used. In any case, the range of object vergencies will be inside the interval $[-\mathcal{A}_i-AA, -\mathcal{A}_i]$, defined by the maximum and minimum accommodation the user can activate.

EXAMPLES

Examples of the method to compute the configuration or lenses having the computed configuration using the total new merit function are provided. For example, a single vision lens with prescription [3,1×45°] and no pantoscopic and facial angles has been calculated with both the new technology and new merit function disclosed above, as "method (a)" and according to the prior technologies and merit functions, as "method (b)".

Figure 8:
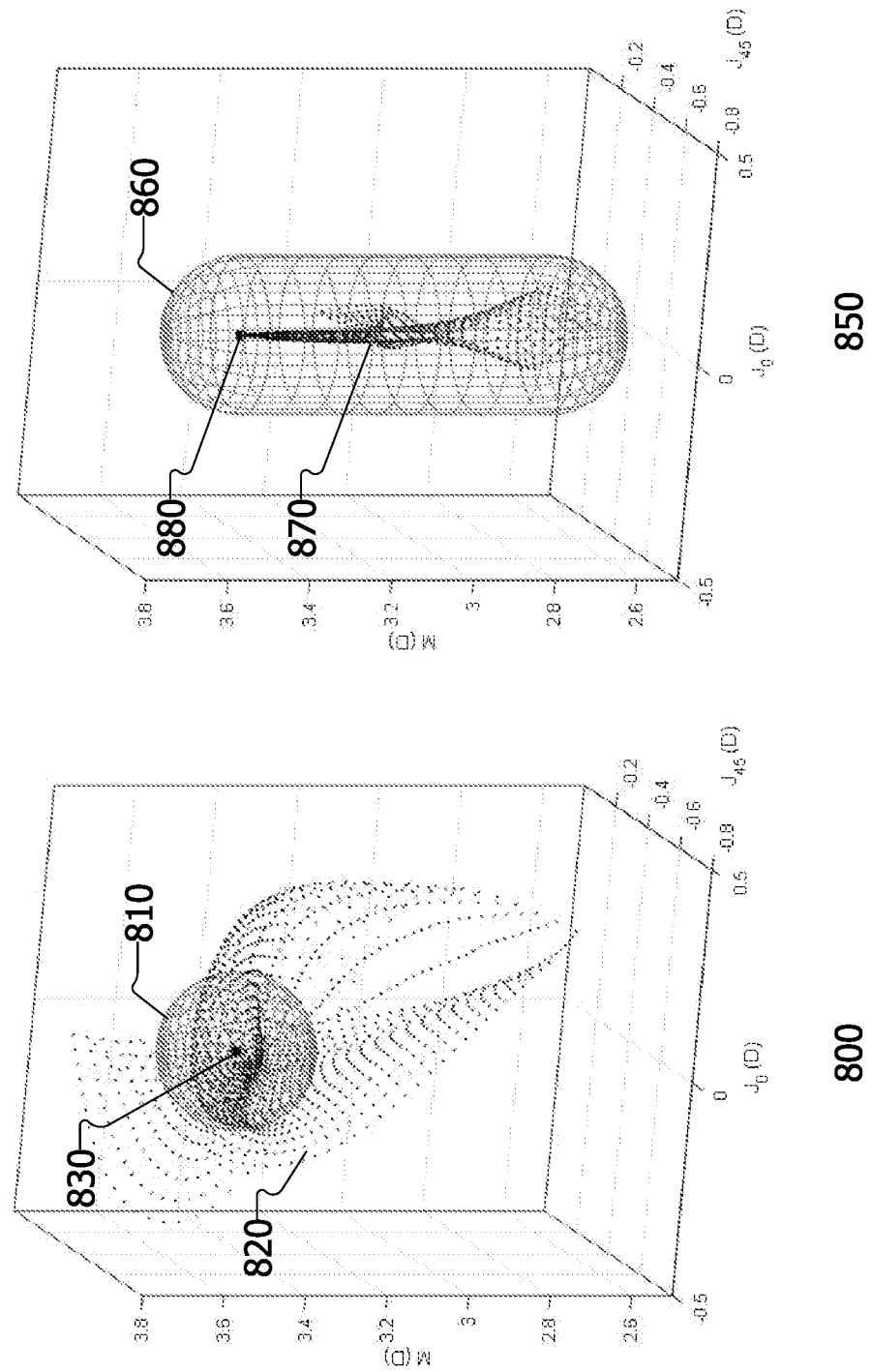
FIG. 8 is a graphic representation that displays the distribution of oblique powers in the power vector space obtained for prior merit functions and the new merit functions for a lens with prescription [3,1×45°] and null facial and pantoscopic angles.

FIG. 8 is a graphic representation that displays the distribution of oblique powers in the power vector space obtained for prior merit functions according to prior method (b) at 800 and the new merit function according to method (a) at 850 for a lens with prescription [3,1×45°] and null facial and pantoscopic angles. The lighter grey area 810 and 860 pictured in the representations 800 and 850, respectively, delimitate the powers inside the region of the wearer's clear vision, defined as the area where VA decays less than a 5%. In 800, no accommodation is assumed, and this region takes the shape of a perfect sphere centered at the prescription. In 850, correcting accommodation up to a value of 0.75 D is assumed, and the region of clear vision extends downward by 0.75 D. Target power is represented as a solid black dot 830 and 880 in both representations 800 and 850, respectively. FIG. 8 shows that there are more powers of the lens (the dark grey points) that are inside the region of the wearer's clear vision (the light grey points) at 850 for a lens produced using new method (a) as compared to at 800 for a lens produced using prior method (b).

Each darker grey point 820 in the space corresponds with an oblique power $P'_i$, while the point $P=(3.5, 0, -0.5)$ D are the coordinates of the target power. The distance between each $P'_i$ and P is the blur the user (namely, the wearer of the lens) would experience for the corresponding sight direction. The amount of blur producing a theoretical reduction of 5% in VA is around 0.18 D, and can be considered the minimum noticeable blur. A sphere of the lighter grey color 810 can then be drawn with radius 0.18 D around the target power P so that any oblique power inside the sphere will produce unnoticeable blur, and points outside this sphere will produce a noticeable drop in visual acuity as shown at 800. At 850, for the new merit function, the effect of accommodation can be represented by deforming the sphere along the vertical direction as shown by the lighter grey color 860. Positive relative accommodation will extend the sphere downward while negative relative accommodation will extend the sphere upwards. When considering the wearer's accommodation as a factor to compensate for some of the oblique mean sphere (component M of the power vector), the points inside the extended sphere will produce no perceptible blur, while points outside the extended sphere will produce blur. The maximum extension of the sphere is given by the saturation values we previously explained, $A_{rel+}$ and $A_{rel-}$. Optimizing the lens with the new merit function as shown at 850 provides drastically superior results, as all the oblique powers of A shown by the darker grey points 870 are inside the extended sphere of lighter grey color 860 and the astigmatism levels are negligible for all directions of sight. A characteristic of the current method is that the oblique astigmatism in points 820 of the lens according to the previous technology, is changed into oblique mean power error in points 870 of the lens according to the new technology, where the mean power error can be compensated by small amounts of accommodation.

Figure 9:
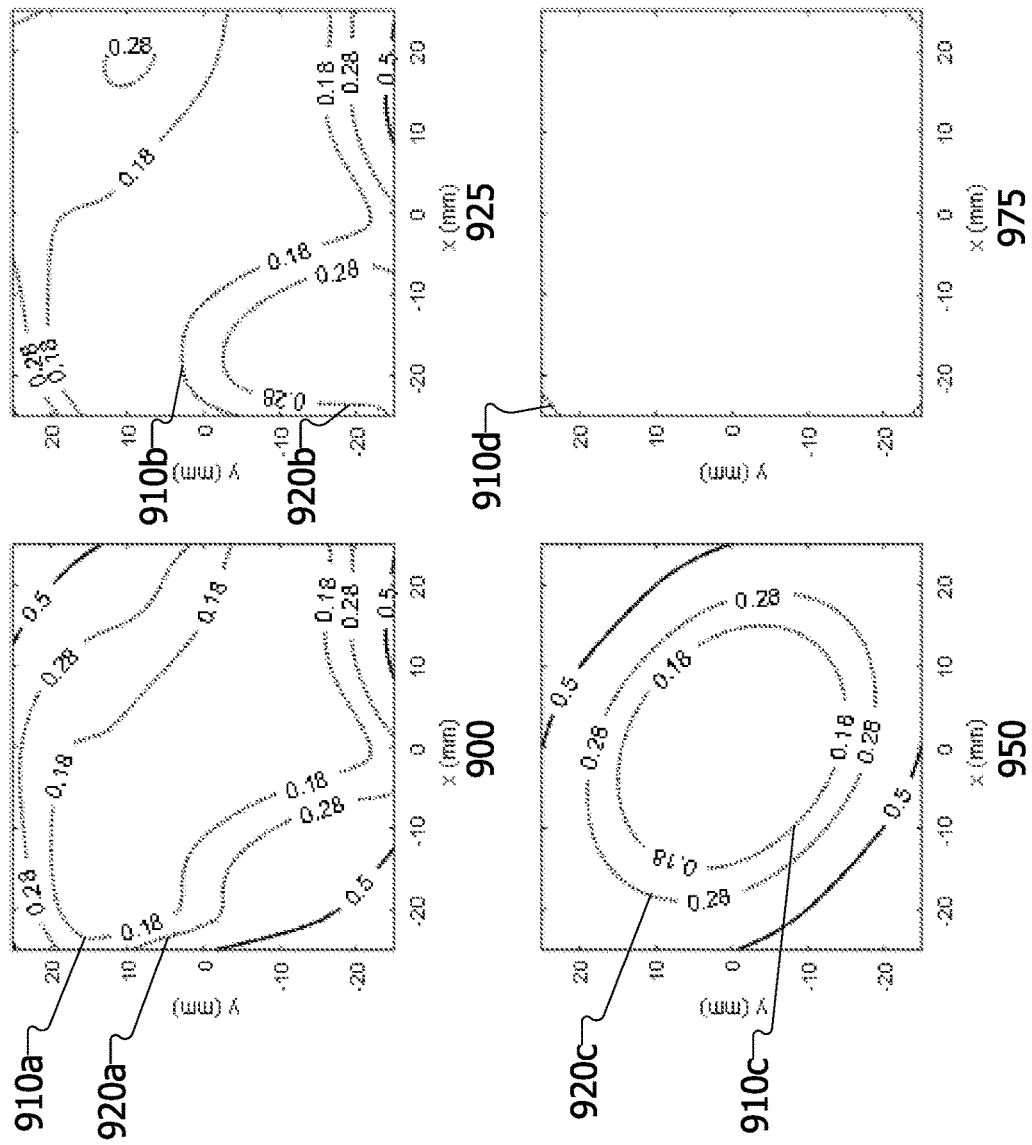
FIG. 9 is a graphic representation of blur maps obtained for prior merit functions and the new merit functions for a lens with prescription [3,1×45°] and null facial and pantoscopic angles.

FIG. 9 is a graphic representation of blur maps obtained for prior merit functions according to method (b) at prior technology representations 900 and 925; and for the new merit function according to method (a) at the new technology representations 950 and 975 for a lens with prescription [3,1×45°] and null facial and pantoscopic angles. Representations 900 and 950 are without wearer's accommodation while 925 and 975 add wearer's accommodation to the merit functions. FIG. 9 shows at 950 and 975 that blur is much less noticeable to a user (see contour lines 910a-d and 920a-d) for a lens produced using new method (a) as compared to at 900 and 925 for a lens produced using prior method (b).

The contour lines 910a-d represent blur below 0.18 D (unnoticeable) and the contour lines 920a-c represent blur below 0.25 D (slightly noticeable). If accommodation is not considered, the lens according to the prior merit functions at representation 900 has a similar or slightly bigger area of unnoticeable blur 910a than blur 910c for the new merit functions at representation 950. However, when accommodation is considered, the unnoticeable blur 910b of the lens according to the prior merit functions at representation 925 does not increase in area very much as compared to unnoticeable blur 910a, without accommodation, at representation 975. On the other hand, when accommodation is considered, the unnoticeable blur 910d of the lens according to the new merit functions at representation 975 increases in area to the point of almost covering the entire lens surface as compared to unnoticeable blur 910c, without accommodation at representation 950. This is because the lens' main aberration in representation 925 is oblique astigmatism, while the lens according to the new merit functions at representation 975 uses the wearer's accommodation to improve the reduction of oblique aberrations, thus increasing the area within 910d with unnoticeable blur by a greater degree than that of the area within 910b. Besides, the blur map of the lens according to the new merit functions, even without accommodation, is much smoother than the map corresponding to the prior merit functions, as a consequence of the use of functions $A_{ij}(M'_i(L_{ij}), M_i, L_{ij})$ and $f(d^2)$.

Figure 10:
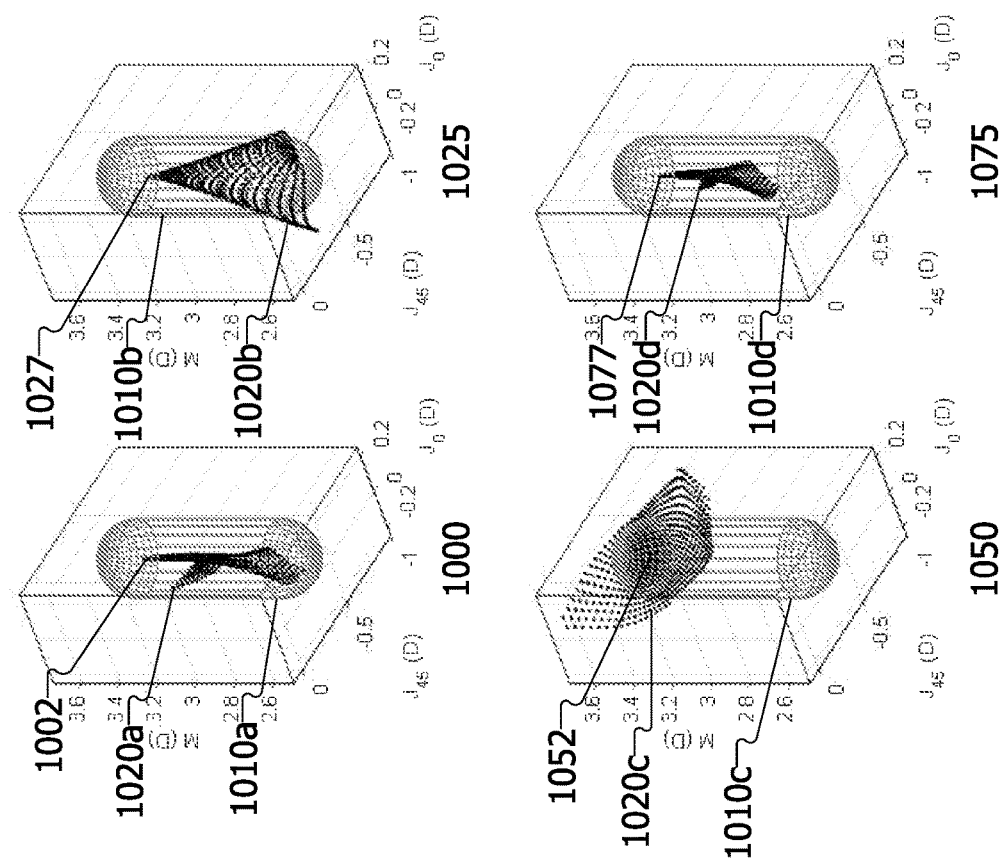
FIG. 10 is a graphic representation of the distribution of oblique powers in the power vector space obtained for prior merit functions of lenses optimized for far and near vision, and used for far and near vision.

FIG. 10 is a graphic representation that displays the distribution of oblique powers in the power vector space obtained for prior merit functions according to method (b) of lenses optimized for far and near vision, and used for far and near vision. FIG. 10 is for a lens with prescription [3,1×45°] and null facial and pantoscopic angles. FIG. 10 shows representation 1000 of oblique errors (e.g., the distance between each of powers $P'_i$ and P) of the lens optimized for far vision (L=0D) and used for far vision (L=0D), representation 1025 of oblique errors of the lens optimized for far vision (L=0D) and used for near vision (L=2D), representation 1050 of oblique errors of the lens optimized for near vision (L=2D) and used for far vision (L=0D) and representation 1075 of oblique errors of the lens optimized for near vision (L=2D) and used for near vision (L=2D). FIG. 10 shows that for lenses produced using prior merit functions according to method (b), good vision quality only exists for the near or far object distance considered in their calculation.

The lighter grey areas 1010a-d pictured in the representations, delimitate the powers inside the region of the wearer's clear vision, defined as the area where VA decays less than a 5% using a maximum accommodation of 0.75D. Target power is represented as a solid black dot 1002, 1027, 1052 and 1077 in representations 1000, 1025, 1050 and 1075, respectively. Each darker grey point 1020a-d in the space corresponds with an oblique power $P'_i$, while the point $P=(3.5, 0, -0.5)$ D are the coordinates of the target power. The distance between each $P'_i$ and P is the blur the user (that is, wearer of the lens) would experience for the corresponding sight direction.

Using the same power vector representation as FIG. 8, the performance of the lens can be assessed for different object vergencies, which is a differentiating and advantageous aspect of the new technology and merit function and compared to others. As shown in FIG. 10, lenses computed according to other technologies and merit function offer good vision quality only when used for the object distance considered in their calculation. As shown by the oblique powers of A in the darker grey points 1020a-d that are inside the extended sphere of lighter grey color 1010a-d, a good vision quality is only offered when looking at distant objects (L=0 D) with a lens optimized for far vision in representation 1000 as shown by points 1020a within points 1010a, or at near objects (L=2 D) with a lens optimized for near vision in representation 1075 as shown by points 1020d within points 1010d. However, an inferior vision quality results when looking at near objects (L=2 D) with a lens optimized for far vision in representation 1025 as shown by points 1020b outside of points 1010b, or at far objects (L=0 D) with a lens optimized for near vision in representation 1050 as shown by points 1020c outside of points 1010c.

Figure 11:
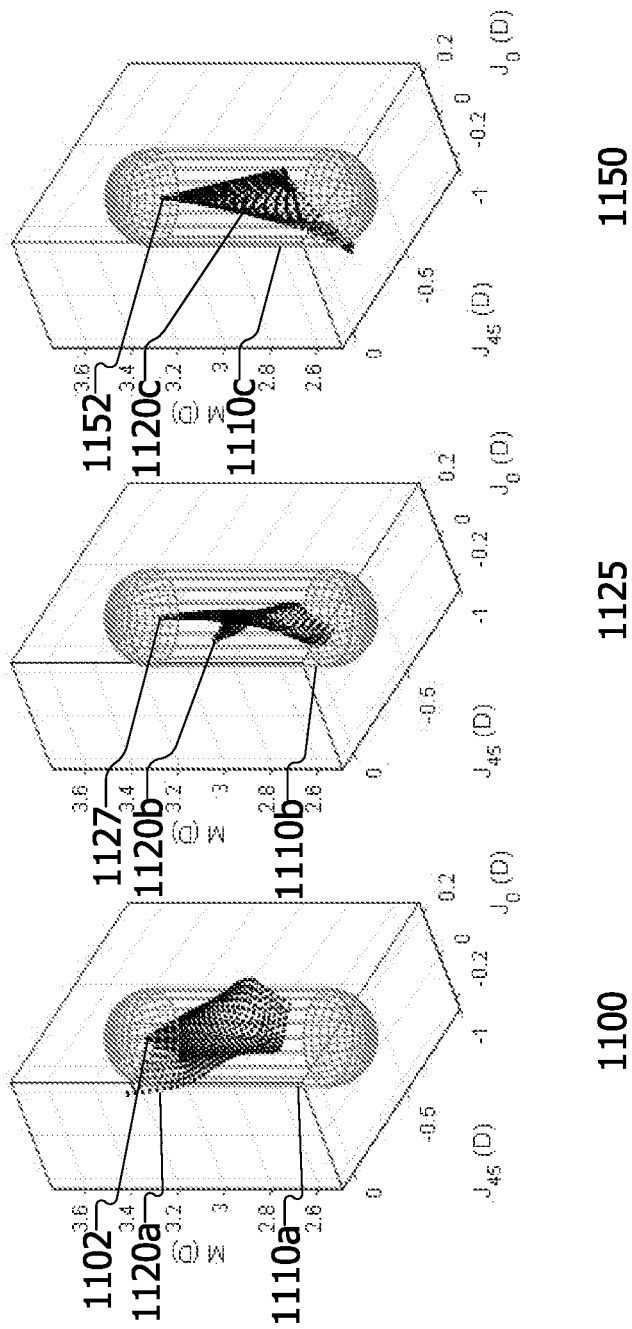
FIG. 11 is a graphic representation of the distribution of oblique powers in the power vector space obtained according to the method and merit functions of lenses optimized for far and near vision, and used for far, intermediate and near vision described herein.

FIG. 11 is a graphic representation that shows the distribution of oblique powers in the power vector space obtained for the new technology and merit functions according to method (a) of lenses optimized for far and near vision, and used for far, intermediate and near vision. FIG. 11 is for a lens with prescription [3,1×45°] and null facial and pantoscopic angles. FIG. 11 shows oblique powers associated to a lens computed considering two object distances in (V: L=0D and L=2D, and used for far vision (L=0D) at representation 1100, intermediate vision (L=1D) at representation 1125 and near vision (L=2D) at representation 1150. FIG. 10 shows that for lenses produced using the new merit function according to method (a), good vision quality exists for the near, intermediate and far object distances including those not considered in the calculation.

The lighter grey areas 1110a-c pictured in the representations, delimitate the powers inside the region of the wearer's clear vision, defined as the area where VA decays less than a 5% using a maximum accommodation of 0.75D. Target power is represented as a solid black dot 1102, 1127 and 1152 in representations 1100, 1125 and 1150, respectively.

Each darker grey point 1120a-c in the space corresponds with an oblique power $P'_i$, while the point P=(3.5, 0, −0.5) D are the coordinates of the target power. The distance between each $P'_i$ and P is the blur the user (e.g., wearer of the lens) would experience for the corresponding sight direction.

Using the same power vector representation as FIGS. 8 and 10, the performance of the lens can be assessed for different object vergencies, which may be a differentiating and advantageous aspect of the new method and merit function and compared to others. FIG. 11 shows that when the previous lens of FIG. 10 is optimized considering two object distances in Φ': far vision (L=0 D) and near vision (L=2 D); the resulting lens offers a more versatile performance over the whole interval of object distances. As seen in FIG. 11 as compared to FIG. 10, lenses computed according to the new technologies and new merit functions proposed herein offer a good vision quality when used for all of the object distances, including those that are not considered in their calculation. As shown by the oblique powers of A in the darker grey points 1120a, b and c that are inside the extended sphere of lighter grey color 1110a, b and, respectively, a good vision quality is offered when looking at far, intermediate and near distant objects with a lens optimized for two object distances.

Figure 12:
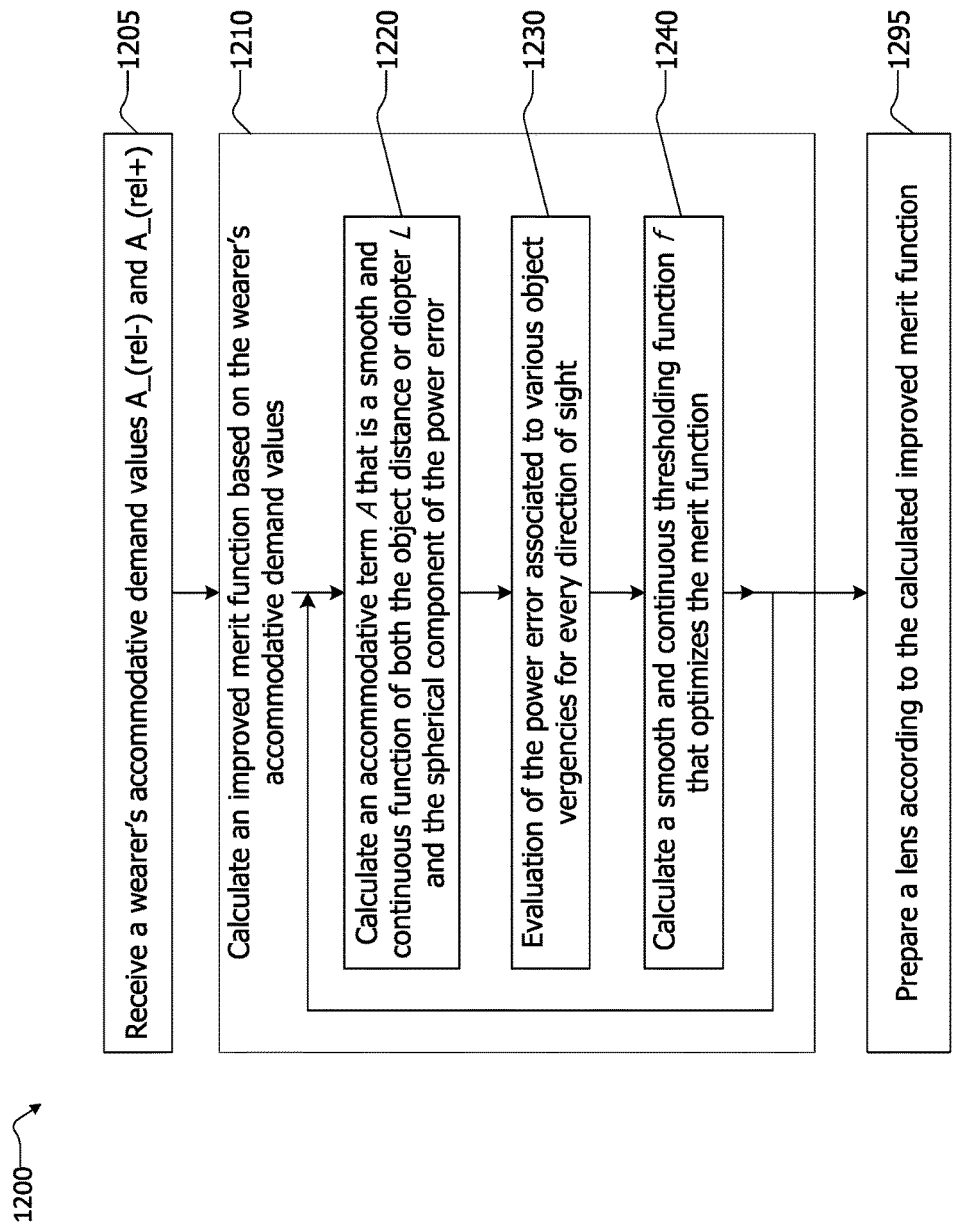
FIG. 12 is a flow diagram of an operating environment/process for configuring ophthalmic lenses that reduce oblique aberrations.

FIG. 12 is a flow diagram of an operating process 1200 for configuring ophthalmic lenses that reduce oblique aberrations. Process 1200 includes an optimization method that uses accommodation to improve the reduction of oblique aberrations in ophthalmic lenses used for single-vision lenses, progressive lenses and occupational lenses.

The process 1200 may be performed by the new merit function or optimization that take into account the accommodation capacity of the user as described herein. The process 1200 may be part of or include any of the new technologies and/or merit functions described herein. The process 1200 starts at 1205 and can end at 1295, but the process can also be cyclical and return to 1205 after 1295, such as to produce another lens. In addition, after 1240 the process may return to 1220 for re-calculating the smooth and continuous thresholding function to optimize the improved total merit function, prior to producing a lens. This return may be repeating 1210 or repeating of 1230 to optimize the merit function.

The process 1200 starts at block 1205 where a wearer's accommodative demand values A_(rel−) and A_(rel+) are received. The demand values may depend on object vergence L and be obtained from optometric measurements, ensuring the accommodative demand values cause no eye strain to the wearer when wearing the lens produced at 1295. The demand values can be received by a computing device such as by being input by a user of the computing device. they may include a wearer's amplitude of accommodation as described herein. Receiving at block 1205 includes receiving a lens prescription for the wearer including sphere S, cylinder C, cylinder axis A and addition Add. Receiving at block 1205 may also include receiving any number of the following: prescription, refractive index, base curve, pantoscopic and facial angles, vertex distance and/or pupillary distances.

After block 1205, at block 1210 an improved total merit function Φ' is calculated based on the wearer's accommodative demand values to reduce oblique aberrations. The new merit function calculated may include one or more of the new methods and merit functions described herein. Calculating the merit function at block 1210 may be achieved according to or using at least two of the calculation in block 1220, the evaluation in block 1230 and/or the calculation in block 1240. The merit function can be computed by a computing device running software. The merit function may be computed or calculated as described herein.

According to block 1220, an accommodative term A is calculated. The accommodative term A is a smooth and continuous function of both the object distance or diopter L and the spherical component of the power error and that ensures the accommodative demand values are well below maximum accommodations available to the wearer in order to prevent eye fatigue.

According to block 1230, evaluation of the power error associated to various object vergencies for every direction of sight is performed. The evaluation at 1230 may include evaluating the defocus for the various object vergencies to balance lens performance for the various object vergencies and increase lens performance for a range of object distances or diopter Ls.

According to block 1240, calculation of a smooth and continuous thresholding function $f$ that is part of the merit function is performed. The calculation at 1240 may include calculating a thresholding function that is continuous and that makes optimization more effective. After 1240, process 1200 may return to 1220 as shown by the arrow to optimize the improved total merit function.

At block 1295 a lens is prepared according to the calculated improved merit function from block 1210. The lens at block 1295 may be manufactured based on or using the results of the calculation at block 1220, the calculation in block 1230 and/or the evaluation at block 1240. The preparing at block 1295 may include incorporating the improved merit function into a lens surface description file and guiding a cutting tool to generate a surface of the lens according to the lens surface description file.

In some cases, calculating at blocks 1210 or 1240 may include repeating of the calculating in blocks 1220-1240 to re-calculate the smooth and continuous thresholding function to optimize the improved total merit function, prior to producing a lens. Repeating may include computing the actual cylinder and sphere produced by the lens and compute the value of $\Phi_0$; then modifying the surface of the lens according to the computed value of $\Phi_0$; and re-computing $\Phi_0$ and comparing the re-computed value with the previous value. In one embodiment, if the new value is smaller, the surface modifications for designing a lens are accepted; and repeating computing, modifying, recomputing and accepting until the smallest possible $\Phi_0$ is obtained. Then at 1295, the lens is manufactured using the smallest possible $\Phi_0$ obtained.

Configuring an ophthalmic lens that reduces oblique aberrations according to process 1200 may include calculating or designing a lens shape, surface shape, optical power, prescription distribution map across the surface of the lens based on the technologies described herein at 1210. The configuring uses the wearer's accommodation received at 1205 during these calculations. Configuring or designing at 1200 may include designing a lens to meet a set of performance requirements and constraints, including cost and manufacturing limitations. Parameters include surface profile types (spherical, aspheric, holographic, diffractive, etc.), as well as radius of curvature, distance to the next surface, material type and optionally tilt and decenter. The process may be computationally intensive, using ray tracing or other techniques to model how the lens affects light that passes through it.

Figure 13:
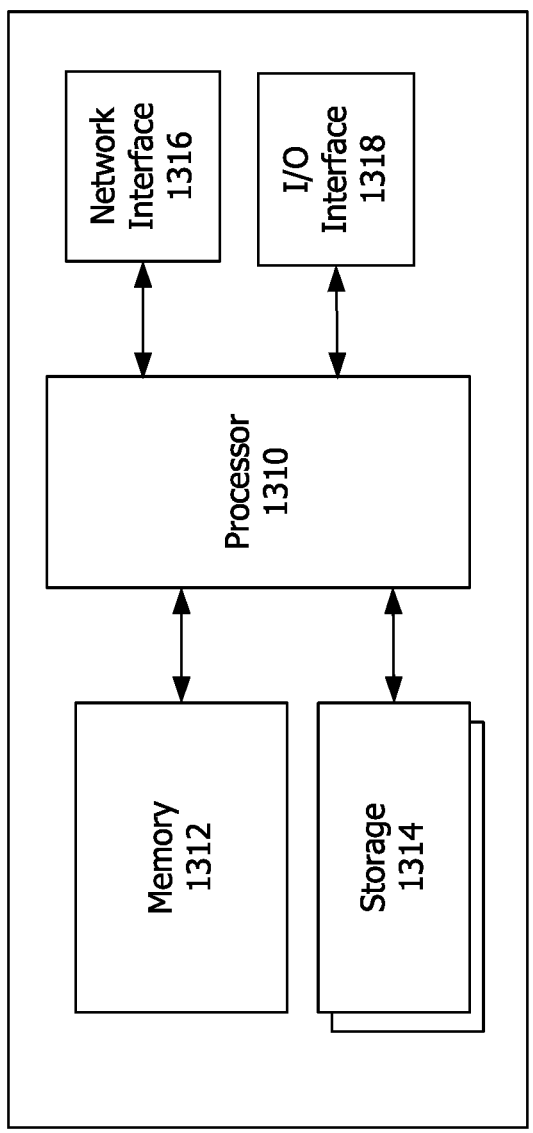
FIG. 13 is a block diagram of a computing device that implements the methods described herein.

FIG. 13 is a block diagram of a computing device 1300. The computing device 1300 may be representative of any of the components of technology for configuring ophthalmic lenses that reduce oblique aberrations as noted herein. Device 1300 may be a specialized computing device that is part of a system, lens production and/or method as noted herein. It may control other components of the system, lens production and/or method. In some cases, the computing device 1300 may be a desktop or laptop computer, a server computer, a computer workstation, or other computer. The computing device 1300 includes software and hardware for providing functionality and features described herein. These computing devices may run an operating system, including variations of the Linux, Microsoft Windows, and Apple Mac operating systems. The methods described herein may be implemented as software stored on machine readable storage media in a storage device included with or otherwise coupled or attached to a computing device.

The computing device 1300 may include one or more of logic arrays, memories, analog circuits, digital circuits, software, firmware and processors. The hardware and firmware components of the computing device 1300 may include various specialized units, circuits, software and interfaces for providing the functionality and features described herein. For example, device 1300 may perform control and processing of configuring ophthalmic lenses that reduce oblique aberrations as noted herein. This includes producing a lens as noted herein, such as at 1295.

The computing device 1300 has a processor 1310 coupled to a memory 1312, storage 1314, a network interface 1316 and an I/O interface 1318. The processor 1310 may be or include one or more microprocessors, field programmable gate arrays (FPGAs), application specific integrated circuits (ASICs), programmable logic devices (PLDs) and programmable logic arrays (PLAs). The memory 1312 may be or include RAM, ROM, DRAM, SRAM and MRAM, and may include firmware, such as static data or fixed instructions, BIOS, system functions, configuration data, and other routines used during the operation of the computing device 1300 and processor 1310. The memory 1312 also provides a storage area for data and instructions associated with applications and data handled by the processor 1310, such as data and instructions associated with the control and processing of calculating a new merit function or optimization that takes into account the accommodation capacity of the user as noted herein. As used herein the term "memory" corresponds to the memory 1312 and explicitly excludes transitory media such as signals or waveforms.

The storage 1314 provides non-volatile, bulk or long-term storage of data or instructions in the computing device 1300, such as data and instructions associated with the control and processing of calculating a new merit function or optimization that takes into account the accommodation capacity of the user as noted herein. The storage 1314 may take the form of a magnetic or solid state disk, tape, CD, DVD, or other reasonably high capacity addressable or serial storage medium. Multiple storage devices may be provided or available to the computing device 1300. Some of these storage devices may be external to the computing device 1300, such as network storage or cloud-based storage. As used herein, the terms "storage" and "storage medium" correspond to the storage 1314 and explicitly exclude transitory media such as signals or waveforms. In some cases, such as those involving solid state memory devices, the memory 1312 and storage 1314 may be a single device. The memory 1312 and/or storage 1314 can include an operating system executing the data and instructions associated with configuring ophthalmic lenses that reduce oblique aberrations as noted herein.

The network interface 1316 includes an interface to a network such as a network that can be used to communicate network packets, network messages, telephone calls, faxes, signals, streams, arrays, and data and instructions associated with the control and processing of calculating a new merit function or optimization that takes into account the accommodation capacity of the user as described herein. The network interface 1316 may be wired and/or wireless. The network interface 1316 may be or include Ethernet capability.

The I/O interface 1318 interfaces the processor 1310 to peripherals (not shown) such as displays, video and still cameras, microphones, user input devices (for example, touchscreens, mice, keyboards and the like). The I/O interface 1318 interface may support USB, Bluetooth and other peripheral connection technology. In some cases, the I/O interface 1318 includes the peripherals, such as displays and user input devices, for user accessed to data and instructions associated with the control and processing of configuring ophthalmic lenses that reduces oblique aberrations as noted herein.

In some cases, storage 1314 is a non-volatile machine-readable storage medium that includes computer readable media, including magnetic storage media, optical storage media, and solid state storage media. It should be understood that the software can be installed in and sold with a system, method and/or the other published content or components for configuring ophthalmic lenses that reduces oblique aberrations as noted herein. Alternatively, the software can be obtained and loaded into the data and instructions associated with configuring ophthalmic lenses that reduces oblique aberrations as noted herein, including obtaining the software via a disc medium or from any manner of network or distribution system, including from a server owned by the software creator or not owned but used by the software creator. The software can be stored on a server for distribution locally via a LAN and/or WAN, and/or to another location via a WAN and/or over the Internet.

By providing data and instructions associated with the control and processing of configuring ophthalmic lenses that reduces oblique aberrations as noted herein, those data and instructions increase computer efficiency because they provide a quicker, automated and more accurate configuring of ophthalmic lenses that reduces oblique aberrations as noted herein. They, in fact, provide better configuring methods, devices, lenses and systems as noted herein.

The technology described herein for configuring ophthalmic lenses that reduce oblique aberrations may be implemented on a computing device that includes software and hardware. A computing device refers to any device with a processor, memory and a storage device that may execute instructions including, but not limited to, personal computers, server computers, computing tablets, smart phones, portable computers, and laptop computers. These computing devices may run an operating system, including, for example, variations of the Linux, Microsoft Windows, and Apple MacOS operating systems.

The methods described herein may be implemented and stored as software on a machine readable storage media in a storage device included with or otherwise coupled or attached to a computing device. That is, the software may be stored on electronic, machine readable media. These storage media include magnetic media such as hard disks, optical media such as compact disks (CD-ROM and CD-RW) and digital versatile disks (DVD and DVD±RW); and silicon media such as solid-state drives (SSDs) and flash memory cards; and other magnetic, optical or silicon storage media. As used herein, a storage device is a device that allows for reading from and/or writing to a storage medium. Storage devices include hard disk drives, SSDs, DVD drives, flash memory devices, and others.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for configuring ophthalmic lenses to reduce oblique aberrations, the method comprising:
   receiving accommodative demand values $A\_(rel-)$ and $A\_(rel+)$ for a lens wearer;
   calculating an improved merit function $\Phi'$ based on the accommodative demand values to reduce oblique aberrations in the ophthalmic lenses according to at least two of the following:
   a. calculating an accommodative term A that is a smooth and continuous function of both an object distance or diopter L and a spherical component of power error, wherein the accommodative term A is computed with a function that includes:
      accommodative demand values $A\_(rel-)$ and $A\_(rel+)$;
      a difference $\Delta$ in mean sphere M between a target lens and an actual lens for each direction of sight according to:

$$\Delta = M'_i - M_i$$

wherein M' is a mean sphere of the actual lens, M is a mean sphere of a target lens and i are the directions of sight; and
   parameters $\Delta_0$ and t of the function;
   b. calculating a smooth and continuous thresholding function $f$ to optimize the improved merit function;
   c. evaluating a power error associated to various object vergencies for every direction of sight, including evaluating defocus for the various object vergencies to balance lens performance and increase lens performance for a range of object distances.

2. The method of to claim 1, wherein:
   the wearer's accommodative demand values $A\_(rel-)$ and $A\_(rel+)$ depend on object vergence L as obtained from optometric measurements including via manual or automatic devices ensuring the accommodative demand values cause no eye strain to the wearer;
   the accommodative term A ensures the accommodative demand values are well below maximum relative accommodations available to the wearer in order to prevent eye fatigue; and
   the power error is associated to various object vergencies for every direction of sight, wherein evaluation of the power error includes evaluating the defocus for the various object vergencies.

3. The method of claim 1, wherein the optometric measurements are statistically inferred from the wearer's demographic and optical characteristics.

4. The method of claim 1, wherein:

$$A_{rel+} = \alpha_+ PRA(L),$$

$$A_{rel-} = \alpha_- NRA(L),$$

where PRA and NRA are clinically measured on the wearer's eyes;
where $\alpha_+$ and $\alpha_-$ are constants satisfying $0 < \alpha_+, \alpha_- < 1$ and providing security margins so that the user noticing the effort of increasing/relaxing accommodation to compensate for oblique mean sphere error is negligible to the user.

5. The method of to claim 1, wherein the thresholding function $f$ is calculated as follows:

$$f(M) = \frac{c}{1 + \frac{e^{-\frac{(M-M_0)}{k}}}{M}}.$$

wherein c, $M_0$ and k are parameters of the model.

6. The method of claim 5, wherein f is a continuous and smooth function of $d^2(P',P, A_i(M'_i,M_i,L))$, the defocus squared, that sets a threshold to the optimization;
wherein P' is an actual power of the lens affected by oblique aberration P'=(M',J'$_0$,J'$_{45}$) for a given direction of sight, P is a target power of the lens as P=(M,J$_0$,J$_{45}$) for a given direction of sight, $A_i$ is an amount of local addition for a given sight direction, wherein M' is a mean sphere of the actual lens, M is a mean sphere of a target lens.

7. The method of to claim 5, wherein the merit function Φ' has the following expression:

$$\Phi' = \sum_{j=1}^{S} \omega_j \left\{ \sum_{i=1}^{N} u_i f\left[ (M'_i(L_j) - M_i - w_{ij} A_{ij}(M'_i(L_j), M_i, L_j))^2 + (J'_{0_i}(L_j) - J_{0_i})^2 + (J'_{45_i}(L_j) - J_{45_i})^2 \right] \right\} \equiv \equiv$$
$$\sum_{j=1}^{M} \omega_j \left\{ \sum_{i=1}^{N} u_i f\left[ d^2(P'_i(L_j), P_i, A_{ij}(M'_i(L_j), M_i, L_j), w_{ij}) \right] \right\}$$

wherein the subindex i denotes directions of sight and j denotes different object distances or diopters L for a given sight direction; S is the total number of object vergencies included inside the range of clear vision while N is the number of sight directions considered for the optimization; and $\omega_j$ are weights that depend on the object vergence;
wherein $u_i$ is the weight assigned to each direction of sight and $w_{ij}$ is a modulating factor of the accommodative term $A_{ij}$ that depends on the direction of sight and the object vergence; and
wherein P' is an actual power of the lens affected by oblique aberration P'=(M',J'$_0$,J'$_{45}$) for a given direction of sight, P is a target power of the lens as P=(M,J$_0$,J$_{45}$) for a given direction of sight, M' is a mean sphere of the actual lens, M is a mean sphere of a target lens, and L is the object distance or diopter.

8. The method of claim 7, wherein $u_i$ and $w_{ij}$ depend on the x and y coordinate of the lens in the optical areas and on the cylinder values in the laterals.

9. The method of claim 7, further comprising:
preparing a lens according to the results of the improved merit function Φ', the preparing including incorporating the improved merit function into a lens surface description file and guiding a cutting tool to generate a surface of the lens according to the lens surface description.

10. The method of claim 7, further comprising receiving a lens prescription for the wearer including sphere S, cylinder C, cylinder axis A and addition Add; and the optimization includes:

computing the actual cylinder and sphere produced by the lens and compute the value of Φ$_0$; then
modifying the surface of the lens according to the computed value of Φ$_0$; and
re-computing Φ$_0$ and comparing the re-computed value with the previous value;
if the new value is smaller, accepting the surface modifications for designing a lens; and
repeating computing, modifying, re-computing and accepting until the smallest possible Φ$_0$ is obtained.

11. A lens manufactured according to the method of claim 10, wherein the lens is manufactured using the obtained minimum value for Φ$_0$.

12. A computing device comprising a storage medium having instructions stored thereon for configuring ophthalmic lenses to reduce oblique aberrations which when executed by a processor in the computing device cause the processor to perform actions including:
receiving accommodative demand values A_(rel−) and A_(rel+) for a lens wearer;
calculating an improved merit function Φ' based on the accommodative demand values to reduce oblique aberrations in the ophthalmic lenses according to at least two of the following:
  a. calculating an accommodative term A that is a smooth and continuous function of both an object distance or diopter L and a spherical component of power error, wherein the accommodative term A is computed with a function that includes:
    accommodative demand values A_(rel−) and A_(rel+);
    a difference Δ in mean sphere M between a target lens and an actual lens for each direction of sight according to:

Δ=M'$_i$−M$_i$ wherein M' is a mean sphere of the actual lens, M is a mean sphere of a target lens and i are the directions of sight; and
    parameters $Δ_0$ and t of the function;
  b. calculating a smooth and continuous thresholding function $f$ to optimize the improved merit function;
  c. evaluating a power error associated to various object vergencies for every direction of sight, including evaluating defocus for the various object vergencies to balance lens performance and increase lens performance for a range of object distances.

13. The computing device of to claim 12, wherein:
the wearer's accommodative demand values A_(rel−) and A_(rel+) depend on object vergence L as obtained from optometric measurements including via manual and automatic devices ensuring the accommodative demand values cause no eye strain to the wearer;
the accommodative term A ensures the accommodative demand values are well below maximum relative accommodations available to the wearer in order to prevent eye fatigue; and
the power error is associated to various object vergencies for every direction of sight, wherein evaluation of the power error includes evaluating the defocus for the various object vergencies.

14. The computing device of to claim 13, wherein the optometric measurements are statistically inferred from the wearer's demographic and optical characteristics.

15. The computing device of claim 12, wherein:

$$A_{rel+} = \alpha_+ PRA(L),$$

$$A_{rel-} = \alpha_- NRA(L),$$

where PRA and NRA are clinically measured including via manual and automatic devices on the wearer's eyes;
where $\alpha_+$ and $\alpha_-$ are constants satisfying $0 < \alpha_+, \alpha_- < 1$ and providing security margins so that the user noticing the effort of increasing/relaxing accommodation to compensate for oblique mean sphere error is negligible to the user.

16. The computing device of to claim 15, wherein the thresholding function $f$ is calculated as follows:

$$f(M) = \frac{c}{1 + \frac{e^{-\frac{(M-M_0)}{k}}}{M}}.$$

wherein $c$, $M_0$ and $k$ are parameters of the model.

17. The computing device of to claim 16, wherein the merit function $\Phi'$ has the following expression:

$$\Phi' = \sum_{j=1}^{S} \omega_j \left\{ \sum_{i=1}^{N} u_i f \left[ (M'_i(L_j) - M_i - w_{ij} A_{ij}(M'_i(L_j), M_i, L_j))^2 + (J'_{0_i}(L_j) - J_{0_i})^2 + (J'_{45_i}(L_j) - J_{45_i})^2 \right] \right\} \equiv \equiv$$

$$\sum_{j=1}^{M} \omega_j \left\{ \sum_{i=1}^{N} u_i f \left[ d^2(P'_i(L_j), P_i, A_{ij}(M'_i(L_j), M_i, L_j), w_{ij}) \right] \right\}$$

wherein the subindex i denotes directions of sight and j denotes different object distances or diopters L for a given sight direction; S is the total number of object vergencies included inside the range of clear vision while N is the number of sight directions considered for the optimization; and $\omega_j$ are weights that depend on the object vergence;
wherein $u_i$ is the weight assigned to each direction of sight and $w_{ij}$ is a modulating factor of the accommodative term $A_{ij}$ that depends on the direction of sight and the object vergence; and
wherein P' is an actual power of the lens affected by oblique aberration $P'=(M',J'_0,J'_{45})$ for a given direction of sight, P is a target power of the lens as $P=(M,J_0,J_{45})$ for a given direction of sight, M' is a mean sphere of the actual lens, M is a mean sphere of a target lens, and L is the object distance or diopter.

18. The computing device of claim 17 the actions further comprising:
preparing a lens according to the results of the improved merit function $\Phi'$, the preparing including incorporating the improved merit function into a lens surface description file and guiding a cutting tool to generate a surface of the lens according to the lens surface description.

19. An ophthalmic lens that reduces oblique aberrations, the lens having a lens surface with a base curve that is personalized for a wearer based on:
the wearer's accommodative demand values A_(rel−) and A_(rel+) which depend on object vergence L as obtained from optometric measurements via manual and automatic devices, ensuring the accommodative demand values cause no eye strain to the wearer;
an improved merit function $\Phi'$ based on the wearer's accommodative demand values to reduce oblique aberrations according to the following:
  a. an accommodative term A that is a smooth and continuous function of both the object distance or diopter L and the spherical component of the power error and ensures the accommodative demand values are well below maximum relative accommodations available to the wearer in order to prevent eye fatigue, wherein the accommodative term A is computed with a function that includes:
  accommodative demand values A_(rel−) and A_(rel+);
  a difference $\Delta$ in mean sphere M between a target lens and an actual lens for each direction of sight according to:

$$\Delta = M'_i - M_i$$

wherein M' is a mean sphere of the actual lens, M is a mean sphere of a target lens and i are the directions of sight; and
  parameters $\Delta_0$ and t of the function;
  b. a smooth and continuous thresholding function $f$ that optimizes the merit function; and
  c. evaluation of the power error associated to various object vergencies for every direction of sight, wherein evaluation of the power error includes evaluating the defocus for the various object vergencies to balance lens performance for the various object vergencies and increase lens performance for a range of object distances or diopters Ls.

20. The ophthalmic lens of claim 19, wherein:

$$A_{rel+} = \alpha_+ PRA(L),$$

$$A_{rel-} = \alpha_- NRA(L),$$

where PRA and NRA are clinically measured on the wearer's eyes;
where $\alpha_+$ and $\alpha_-$ are constants satisfying $0 < \alpha_+, \alpha_- < 1$ and providing security margins so that the user noticing the effort of increasing/relaxing accommodation to compensate for oblique mean sphere error is negligible to the user.

21. The ophthalmic lens of to claim 20, wherein the thresholding function $f$ is calculated as follows:

$$f(M) = \frac{c}{1 + \frac{e^{-\frac{(M-M_0)}{k}}}{M}}.$$

wherein $c$, $M_0$ and $k$ are parameters of the model.

22. The ophthalmic lens of to claim 21, wherein the merit function $\Phi'$ has the following expression:

$$\Phi' = \sum_{j=1}^{S} \omega_j \left\{ \sum_{i=1}^{N} u_i f \left[ (M'_i(L_j) - M_i - w_{ij} A_{ij}(M'_i(L_j), M_i, L_j))^2 + (J'_{0_i}(L_j) - J_{0_i})^2 + (J'_{45_i}(L_j) - J_{45_i})^2 \right] \right\} \equiv \equiv$$

$$\sum_{j=1}^{M} \omega_j \left\{ \sum_{i=1}^{N} u_i f \left[ d^2(P'_i(L_j), P_i, A_{ij}(M'_i(L_j), M_i, L_j), w_{ij}) \right] \right\}$$

wherein the subindex i denotes directions of sight and j denotes different object distances or diopters L for a given sight direction; S is the total number of object vergencies included inside the range of clear vision while N is the number of sight directions considered for the optimization; and $\omega_j$ are weights that depend on the object vergence;

wherein $u_i$ is the weight assigned to each direction of sight and $w_{ij}$ is a modulating factor of the accommodative term $A_{ij}$ that depends on the direction of sight and the object vergence; and wherein P' is an actual power of the lens affected by oblique aberration $P'=(M',J'_0,J'_{45})$ for a given direction of sight, P is a target power of the lens as $P=(M,J_0,J_{45})$ for a given direction of sight, M' is a mean sphere of the actual lens, M is a mean sphere of a target lens, and L is the object distance or diopter.

\* \* \* \* \*